Dec. 3, 1929.   J. P. NORTHEY   1,737,669
RAIL JOINT
Filed Feb. 21, 1929

Inventor
J. P. Northey
by J. Edw. Maybee
ATTY.

Patented Dec. 3, 1929

1,737,669

UNITED STATES PATENT OFFICE

JOHN P. NORTHEY, OF TORONTO, ONTARIO, CANADA

RAIL JOINT

Application filed February 21, 1929. Serial No. 341,693.

This invention relates to rail joints in which angle bars or fish plates are secured to the rail ends at opposite sides. As such joints are ordinarily made, any one or more of the bolts may have to take the stresses imparted by the expansion and contraction of the rails with the result that the bolts are bent and the nuts loosened.

My object in the present invention is to devise a joint in which the liability of such trouble occurring is materially lessened and the security of the joint thus increased.

I attain my object by so designing the joint that some only of the bolts are subjected to the stresses due to rail expansion and contraction, leaving to the remaining bolts the duty of holding the angle bars tightly in position against the sides of the rails, thus ensuring the rail ends being supported accurately in alinement. The latter bolts will usually be those nearest the rail ends where any loosening of the grip of the angle bars is most dangerous.

A further object is to provide means for supporting the bolts so as to minimize the danger of their being bent by the stresses to which they are subjected.

Figure 1:
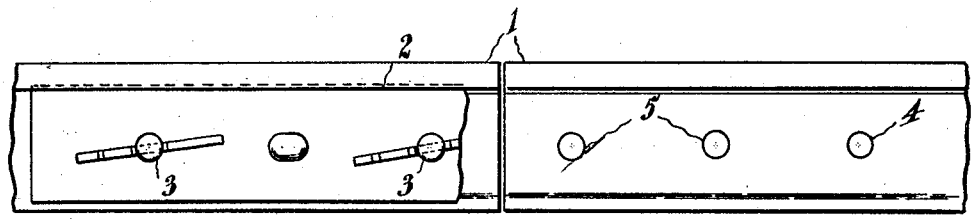
Figure 2:
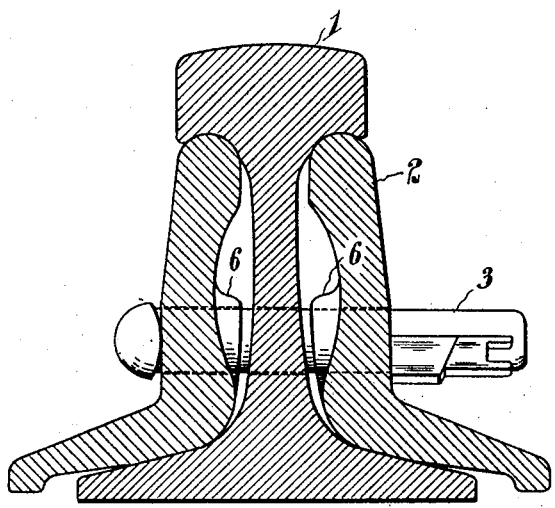

The invention is hereinafter more specifically described and is illustrated in the accompanying drawings in which Fig. 1 is a side elevation, partly broken away, of a rail joint constructed in accordance with my invention;

Fig. 2 a cross section of the joint; and

Figure 3:
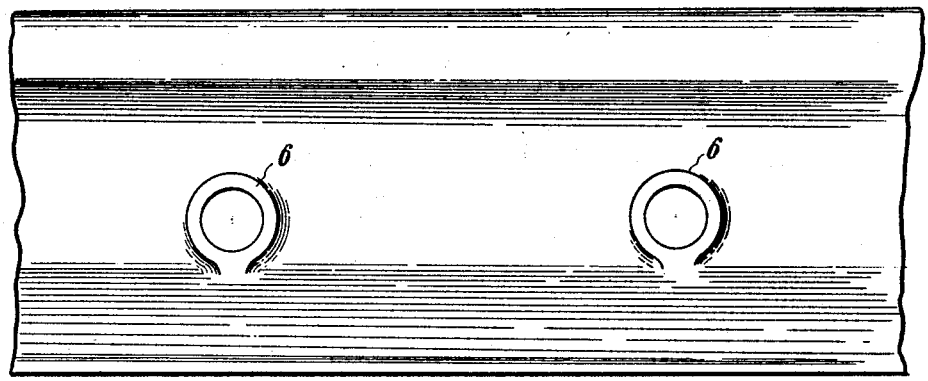

Fig. 3 an elevation of part of the inner face of a splice bar.

In the drawings like numerals of reference indicate corresponding parts in the different figures.

In the drawings 1 are the rail ends, 2 the splice bars, which approximate in shape the commonly employed angle bars, except as hereinafter set forth, and 3 are key bolts, in the main of the type now known in the art.

The rails may be in cross section of any form commonly employed for a given size and weight. I prefer, however, to form them as in my co-pending application No. 336,901, filed Feb. 1st, 1929, in which the under surfaces of the head of the rail are shaped to form anchorages for the upper ends of the splice bars 2. I am thus enabled to lower the position of the bolts 3 to give them efficient leverage in drawing the angle bars to position, thus materially reducing the strain on the bolts themselves.

Ordinarily all the bolt holes in the web of the rail are formed of the same size so that any one or more of the bolts may have to take the stresses due to the contraction and expansion of the rails. It will be noted, particularly on reference to Fig. 1, that I form the bolt holes 4 nearest the ends of the splice bars, and therefore furthest from the rail end, of such a size that the stems of the bolt will fit more closely in the same than in the intermediate bolt holes 5. While this may be effected in various ways, it will usually be done by forming the holes 5 of a greater diameter than the holes 4. (See Fig. 1.)

As one of the troubles with ordinary rail joints is that the angle bars are spaced from the web of the rail, the bolts are easily bent when subjected to stresses due to the expansion and contraction of the rails. I minimize this trouble by forming the bosses 6 on the inner face of the splice bars, these bosses extending comparatively close to the sides of the web of the rail. The stems of the bolts will be as closely fitted in the holes of the splice bar as possible, and hence the bolts are supported almost up to the web of the rail.

It will be found that a rail joint constructed as hereinbefore set forth is very strong and is not liable to loosen in use, as rail joints of ordinary construction, due to the fact that certain of the bolts have to take the bending stresses, while the remaining bolts have solely the function of keeping the angle bars tightly in place, which function they perform the more effectively due to the fact that the upper edges of the angle bars are locked to the rail head, leaving the bolts only subject to the task of holding in position the lower edges of the splice bars.

What I claim as my invention is:

1. In a rail joint, the combination of rail ends; splice bars engaging the sides of the rail ends; and bolts passing through the splice bars, certain of the bolts having less play in the holes in the rail webs through which they pass than the remaining bolts, whereby said closely fitting bolts take all the longitudinal stresses due to rail contraction and expansion, the inner faces of the splice bars being spaced from the rail web and provided with bosses surrounding the holes through which the bolts taking longitudinal stresses pass, which bosses extend close to the rail web.

2. A rail joint according to claim 1, in which the upper edges of the angle bars have a rocking interlocking engagement with the under surfaces of the head of the rail to resist outward displacement.

Signed at Toronto, Canada, this 16th day of February, 1929.

JOHN P. NORTHEY.